United States Patent [19]

Ohta et al.

[11] Patent Number: 5,231,923
[45] Date of Patent: Aug. 3, 1993

[54] PRESS APPARATUS USED FOR MANUFACTURING A LIQUID CRYSTAL PANEL

[75] Inventors: Kazuhiro Ohta, Toyokawa; Shoji Uchimura, Nagoya; Sigeyuki Takagi, Toyohashi; Kyoji Furukawa, Toyokawa, all of Japan

[73] Assignee: Sintogokio Ltd., Nagoya, Japan

[21] Appl. No.: 872,199

[22] Filed: Apr. 22, 1992

[30] Foreign Application Priority Data

Jul. 12, 1991 [JP] Japan ............... 3-62489[U]
Jul. 12, 1991 [JP] Japan ............... 3-198367

[51] Int. Cl.$^5$ ............................. B30B 15/26
[52] U.S. Cl. ................................ 100/46; 100/43; 100/50; 100/93 P; 100/99; 100/258 A; 156/378; 156/583.1; 425/149
[58] Field of Search .......... 100/43, 46, 48, 50, 100/93 P, 99, 258 R, 258 A, 289, 915; 156/358, 359, 368, 378, 583.1; 425/149, 170

[56] References Cited

U.S. PATENT DOCUMENTS

| 2,273,730 | 2/1942 | Varcoe et al. | 100/289 X |
| 2,358,765 | 9/1944 | Stadlin | 100/915 X |
| 3,754,499 | 8/1973 | Heisman et al. | 100/93 P |
| 3,817,801 | 6/1974 | Widmer | 156/378 X |
| 4,413,967 | 11/1983 | Burry | 425/149 |
| 4,526,095 | 7/1985 | Rewitzer | 100/99 X |
| 4,533,424 | 8/1985 | McElroy | 156/378 |
| 4,723,429 | 2/1988 | Weber et al. | 100/99 X |
| 4,724,757 | 2/1988 | George | 100/43 X |
| 4,766,758 | 8/1988 | Lucas et al. | 100/99 X |
| 4,949,634 | 8/1990 | Shaner | 425/149 X |
| 5,119,311 | 6/1992 | Gold et al. | 100/99 X |

FOREIGN PATENT DOCUMENTS

| 2814988 | 10/1979 | Fed. Rep. of Germany | 100/99 |
| 59-31127 | 2/1984 | Japan | 425/149 |
| 60-94320 | 5/1985 | Japan | 425/149 |
| 3-86395 | 4/1991 | Japan | 100/99 |

Primary Examiner—Stephen F. Gerrity
Attorney, Agent, or Firm—Armstrong, Westerman, Hattori, McLeland & Naughton

[57] ABSTRACT

A press apparatus for use in manufacture of a liquid crystal panel presses upper and lower glass substrates placed between a pressure-exerting plate and a pressure-receiving plate while a seal located around the glass substrates is being heated and melted. The pressure-exerting plate is supported by a pressure-transmitting plate through three load cells. The pressure-transmitting plate presses the pressure-exerting plate against the pressure-receiving plate through the load cells and thereby presses the glass substrates uniformly. When a difference between the detection values of the load cells exceeds a predetermined value, it is determined that the glass substrates are not being pressed uniformly and the pressing operations thus stopped.

12 Claims, 4 Drawing Sheets

PRESS APPARATUS USED FOR MANUFACTURING A LIQUID CRYSTAL PANEL

BACKGROUND OF THE INVENTION

The present invention relates to a press apparatus for use in manufacturing a liquid crystal panel which comprises upper and lower glass substrates with transparent electrodes formed thereon, the liquid crystal cell having a predetermined gap between the two glass substrates. The peripheral portion of the liquid crystal cell is sealed by sealing resin.

In the conventional liquid crystal panel manufactured in the manner described above, a non-uniform gap between the glass substrates causes irregularity of the color of the liquid crystal panel. Hence, the gap must be made uniform over the entirety of the glass substrates. To achieve this, spherical beads having the same diameter may be scattered between the glass substrates. For the glass substrate is very thin, non-uniform pressing thereof thus forms a curved portion which precludes sharp display. Since such glass substrates with the transparent electrodes formed thereon are expensive and since they must be discarded if a uniform gap is not obtained therebetween improvement of the yield has been desired. Uniform pressing requires not only parallelization between the glass substrates but also that between the pressure-exerting plate and the pressure-receiving plate of a press apparatus for pressing the glass substrates. Such a means for ensuring uniform pressing, however, has not yet been available.

SUMMARY OF THE INVENTION

An object of the present invention is to provide a press apparatus which is capable of performing press operation while checking the pressurized state of two glass substrates of a liquid crystal panel in order to stop the press operation at once when an abnormality occur.

To achieve this object, the present invention provides, a press apparatus for use in manufacturing a liquid crystal panel, including a pressure-exerting plate and a pressure-receiving plate, and exerting pressure to upper and lower glass substrates for the liquid crystal panel which are set between the pressure-exerting plate and the pressure-receiving plate, wherein the apparatus comprising three load cells for supporting one of the pressure-exerting plate and the pressure-receiving plate, the load cells being disposed at positions corresponding to vertexes of a triangle, as viewed in a plan view, to detect a degree of parallelization between the pressure-exerting plate and the pressure-receiving plate while the press apparatus is exerting pressure to the upper and lower glass substrates.

According to one specific form of the present invention, in a plan view the pressing operation is performed while the differences between the loads of the load cells are electrically checked. The load applied to each of the load cells is monitored by the CRT display so as to determine whether the glass substrate is placed at an incorrect position or whether replacement of the glass substrate is necessary. It is thus possible to greatly improve yield of the manufacture of liquid crystal panels.

DETAILED DESCRIPTION OF THE PREFERRED EMBODIMENT

Figure 1:
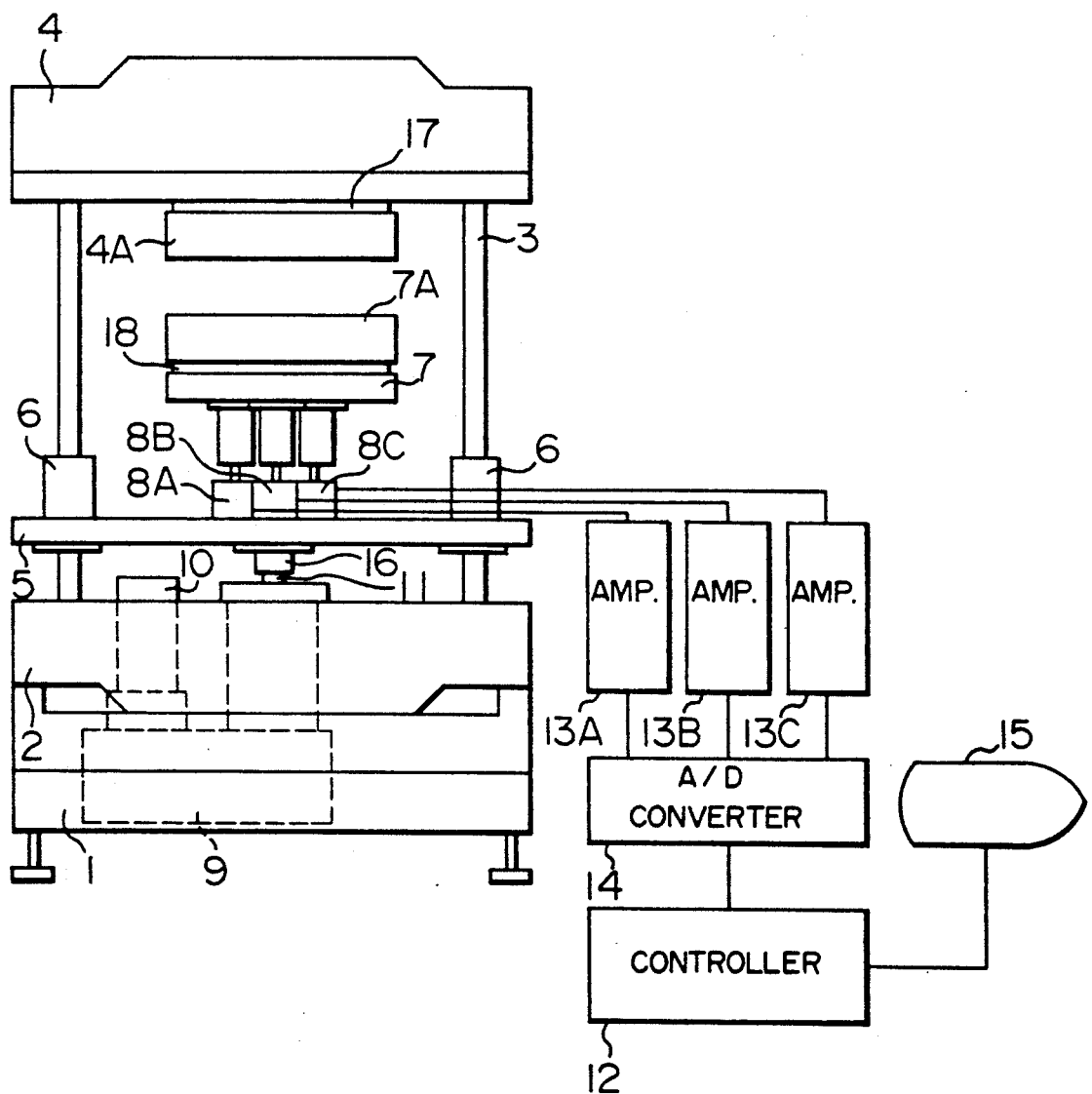
FIG. 1 is a front view illustrating an embodiment of the present invention.

An embodiment of the present invention will be described below with reference to the accompanying drawings. A base plate 2 is fixed to an upper portion of a base 1, and a pole 3 is provided at each of four corners of the base plate 2. A fixed plate 4 with a pressure-receiving plate 4A mounted on an undersurface thereof through a temperature insulating plate 17 is fixed to the upper ends of the poles 3.

A pressure transmitting plate 5 is fitted to the poles 3 through sleeves 6 in such a manner as to be movable up and down. A movable plate 7 with a pressure-exerting plate 7A fixed to the upper surface thereof through a temperature insulating plate 18 is supported by three load cells 8A, 8B and 8C disposed on the upper surface of the pressure-transmitting plate 5 at positions corresponding to the vertexes of an equilateral triangle, as viewed from above.

A housing 9 is fixed to the base 1, and an electric servo motor 10 is mounted on the upper surface of the housing 9 in such a manner that an output shaft thereof is directed downward.

A pressing shaft 11 whose proximal end has a ball nut structure passes through the housing 9 in such a manner as to be slidable along the upper surface of the housing 9. The ball nut structure (not shown) of the pressing shaft 11 engages with a ball screw (not shown) supported in a vertical direction within the housing 9, by which rotation of the rotary shaft (not shown) of the servo motor 10 is transmitted to the pressing shaft 11. The pressure-transmitting plate 5 is horizontally fixed to the upper end of the pressing shaft 11 through a bracket 16.

The load cells 8A, 8B and 8C are electrically connected to a controller 12 which is a microcomputer through amplifiers 13A, 13B and 13C and an A/D converter 4. The controller 12 converts the A/D-converted signals from the load cells 8A, 8B and 8C into actual loads, and calculates differences between the individual loads of the load cells 8A, 8B and 8C. When the obtained differences are larger than the values which are set using the set values in the microcomputer, it is determined that the applied loads are not uniform, and this abnormality is informed to the worker by means of a buzzer or the like.

A CRT display 15 is electrically connected to the controller 12 so as to allow the load applied to each of the load cells 8A, 8B and 8C to be monitored. Consequently, it is possible to determine how the loads applied to the load cells are unbalanced. This in turn makes determination possible as to whether or not the liquid crystal panel 37 is set at the normal position of the pressure-exerting plate 7A or as to whether or not the upper and lower glass substrates 31A, 31B of the liquid crystal panel 37 have a failure.

Figure 2:
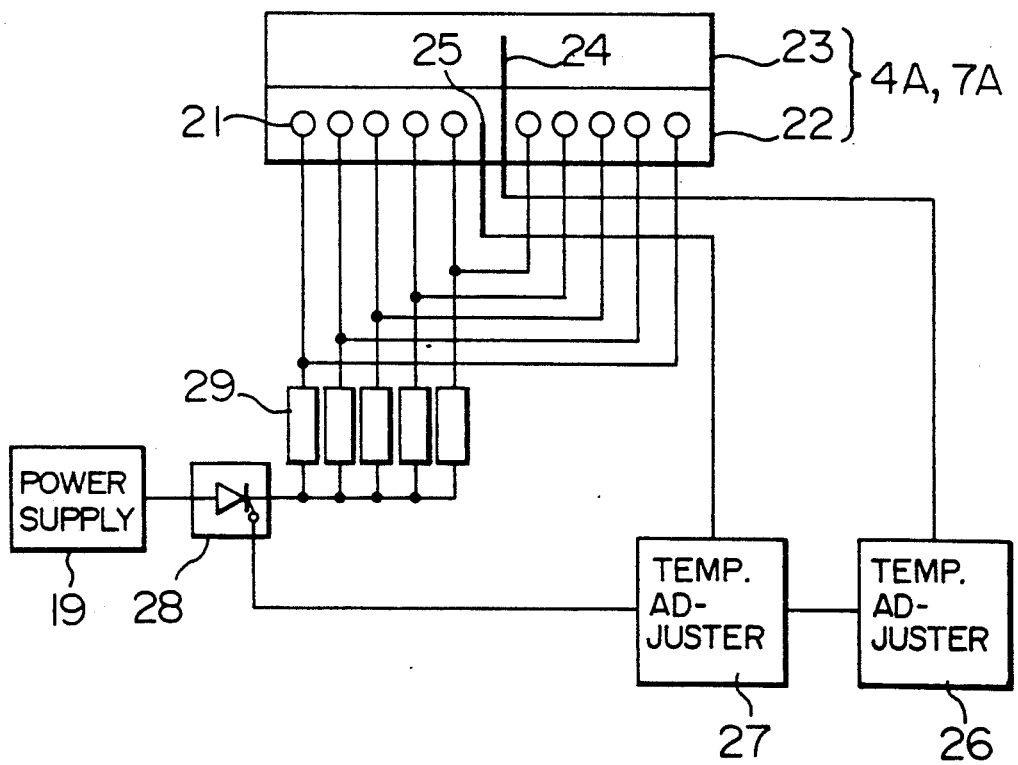
FIG. 2 is a schematic view illustrating a pressure-receiving plate or a pressure-exerting plate.
Figure 3:
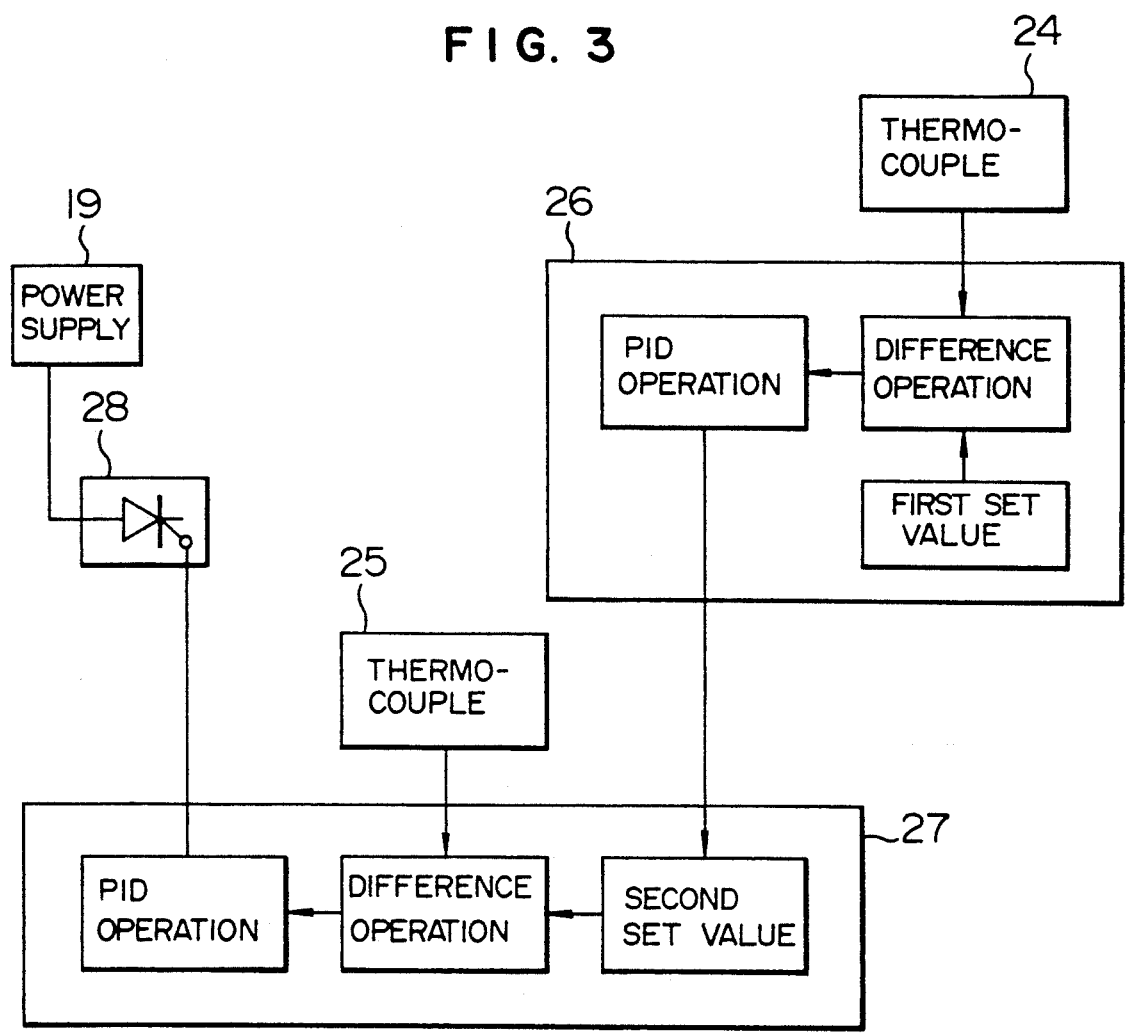
FIG. 3 is a block diagram showing an electric configuration for controlling heating of the pressure-receiving plate or the pressure-exerting plate.

The inner structure of the pressure-receiving plate 4A and pressure-exerting plate 7A will be described in detail below with reference to FIG. 2. Since the inner structure of the pressure-receiving plate 4A and that of the pressure-exerting plate 7A are substantially the same, only the pressure-exerting plate 7A will be described in detail.

The pressure-receiving plate 4A is made up of a metallic heating plate 22 and a ceramic plate 23 fixed to the surface of the heating plate 22. Thermocouples 24 and 25 are embedded in the ceramic plate 23 and the metallic heating plate 22, respectively. The thermocouple 24 detects the temperature near the surface of the ceramic plate 23. The thermocouple 25 detects the temperature near heaters 21 of the heating plate 22.

The thermocouples 24 and 25 are electrically connected to a temperature adjuster 26 for the ceramic plate 23 and a temperature adjuster 27 for the heating plate 22, respectively. The output terminal of the temperature adjuster 26 for the ceramic plate 23 is electrically connected to a remote input terminal of the temperature adjuster 27 for the heating plate 22.

The output terminal of the temperature adjuster 27 for the heating plate 22 is connected to a thyristor 28 for supplying electric power to the heaters 21 from a power supply 19.

The thyristor 28 is connected to heaters 21 through power adjusters 29 corresponding to the heaters 21.

In the pressure-receiving plate 4A or pressure-exerting plate 7A arranged in the manner described above, the metallic heating plate 22 and the ceramic plate 23 are heated by supplying power to the heaters 21. At that time, the temperature of the surface portion of the ceramic plate 23 is measured by the thermocouple 24. The measured value is input to the temperature adjuster 26 which performs PID operation using a difference between the measured value and a first set value, and calculates the output. The output of the temperature adjuster 26 (which is made between 0 and 100%) is input to the remote input terminal of the temperature adjuster 27. The temperature adjuster 27 calculates the second set value of the temperature of the plate using the arithmetic expression determined beforehand by the second set value of the temperature adjuster 27. If the output of the PID operation is 0%, 180° C. is set as the second set value. If the output of the PID operation is 50%, 190° C. is set as the second set value. If the output of the PID operation is 100%, 200° C. is set as the second set value. The temperature adjuster 27 performs PID operation using this second set value and the temperature value of the heating plate 22 which is detected by the thermocouple 25, and controls the thyristor 28 and hence the heaters 21 on the basis of the output thereof. It is therefore possible to accurately and stably set the surface temperature of the ceramic plate 23 to a predetermined desired temperature.

The operation of the press apparatus arranged in the manner described above will be described below.

First, the liquid crystal panel 37 pressed by the aforementioned press apparatus will be described with reference to FIG. 4.

Figure 4:
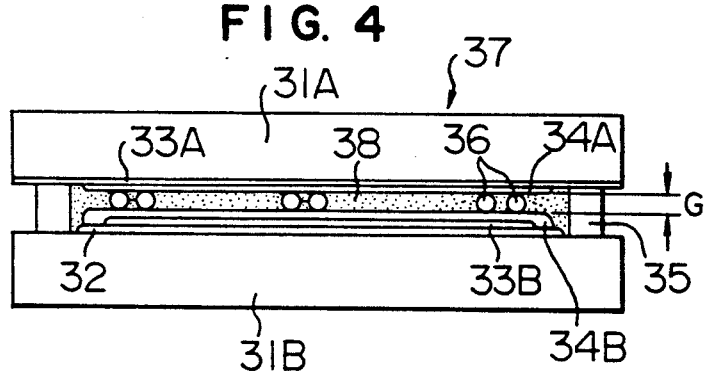
FIG. 4 is a cross-sectional view of a liquid crystal panel which is pressed by the press machine shown in FIG. 1.

As shown in FIG. 4, a color filter 32 is provided on the inner surface of the lower glass substrate 31B, and a transparent electrodes 33A, 33B disposed on the inner surface of the upper glass substrate 31A and the color filter 32. Orienting films 4A, 34B are coated on each of the transparent electrodes 33A, 33B. A gap of liquid crystal cell 38 between the orienting films 34A, 34B i.e., gap G, must be uniform over the entire orienting films 34A, 34B. Hence, the glass substrates 31A, 31B must be uniformly pressed between the pressure-receiving plate 4A and pressure-exerting plate 7A while a sealing resin 35 provided around the liquid crystal cell 38 is being melted by the aforementioned heaters. In FIG. 4, reference numerals 36 denotes spacers disposed to obtain gap G, which may be spherical beads.

In the state shown in FIG. 1, a liquid crystal panel 37 is placed on the pressure-exerting plate 7A. Next, an electric current is supplied to the heaters 21 incorporated in the pressure-receiving plate 4A and the pressure-exerting plate 7A to accurately heat the pressure-receiving plate 4A and the pressure-exerting plate 7A up to predetermined temperatures in the manner described above. Concurrently with this, the servo motor 10 is activated to apply a predetermined amount of pressure to the two glass substrates 31A, 31B and pressure-receiving plate 4A through the pressure-exerting plate 7A for a predetermine period of time.

When the two glass substrates 31A, 31B are pressurized for a predetermined period of time while they are heated to a predetermined temperature in the manner described above, the sealing resin 35 is heated and melted and then set, thus a liquid crystal panel 37 with no liquid crystal is obtained.

At that time, the controller 12 calculates differences between the loads of the load cells 8A, 8B and 8C. When the obtained differences are larger than the preset values, it is determined that the loads are not applied uniformly due to, for example, deviation of the liquid crystal panel 37 from the fixed position, and the controller 12 sends a signal to a buzzer (not shown) to warn the worker of abnormality. At this time, the CRT display is monitoring the load applied to each of the load cells. Therefore, it is possible to check whether the abnormality is caused by positional deviation or abnormality of the glass substrate.

In order to simulate the application of unequal pressure, the liquid crystal panel 37 was set on the pressure exerting-plate 7A with the center thereof being shifted from the center of the pressure exerting-plate 7A by 1 mm. In this case, the difference between specific two of the loads detected by the load cells 8A, 8B and 8C exceeded 100 kg.

REFERENCE EXAMPLE 1

Experiment was made with a liquid crystal panel having a size of 330 mm × 330 mm with the use of the press apparatus shown in FIG. 1 under the following conditions:

| | |
|---|---|
| size of pressure exerting and receiving plates: | 380 mm × 380 mm |
| maximum applied force: | 3 ton |
| stroke speed: | 8 mm/sec |
| applied pressure range: | 0.5 to 2.8 kg/cm$^2$ |
| maximum heating temp.: | 200 deg. C. |

First, with nothing being set on the pressure exerting plate, the pressure exerting plate was made into press-contact with the pressure receiving plate under a certain force, for example, 1.5 ton, and then the load cells 8A, 8B, 8C were adjusted in order that they give read values which are equal to each other, that is, for example, 500 kg.

Next, the liquid crystal panel was set on the pressure exerting plate, the centers thereof being aligned with each other, and was then pressed against the pressure receiving plate by raising the pressure exerting plate under the conditions listed above. That is, the pressure applied to the glass surfaces of the liquid crystal panel was maintained in a range from 1 to 2.7 kg/cm$^2$. Differences between each two of applied forces detected by the load cells 8A, 8B, 8C were within a range of 50 to 100 kg. Accordingly, it was ensured that if the difference between each two of the applied loads falls within the range of 50 to 100 kg, the glass substrates of the liquid crystal panel can be pressed uniformly over their entire surfaces.

REFERENCE EXAMPLE 2

Similar experiment was made with a liquid crystal panel having a size of 450 mm × 330 mm under the following conditions:

| | |
|---|---|
| size of the pressure exerting and receiving plates: | 500 mm × 380 mm |
| maximum applied force: | 3 ton |
| applied pressure range: | 0.5 to 2.0 kg/cm$^2$ |
| stroke speed: | 8 mm/sec |
| maximum heating temp.: | 200 deg. C. |

Similar results as mentioned in the above-mentioned reference example 1 were obtained.

REFERENCE EXAMPLE 3

Similar experiment was made with a liquid crystal panel having a size of 500 mm × 400 mm under the following conditions:

| | |
|---|---|
| size of pressure exerting and receiving plates: | 550 mm × 450 mm |
| maximum applied force: | 5 ton |
| applied pressure range: | 0.5 to 2.5 kg/cm$^2$ |
| stroke speed: | 8 mm/sec |
| maximum heating temp.: | 200 deg. C. |

Similar results as mentioned in the above-mentioned reference example 1 were obtained.

From the above-mentioned experiments, it was found that liquid crystal panels can be suitably pressed by a pressure in a range of 0.5 to 3 kg/cm$^2$ with a difference between each two of loads detected by the load cells 8A, 8B, 8C being within a range of 50 to 100 kg.

Figure 5:
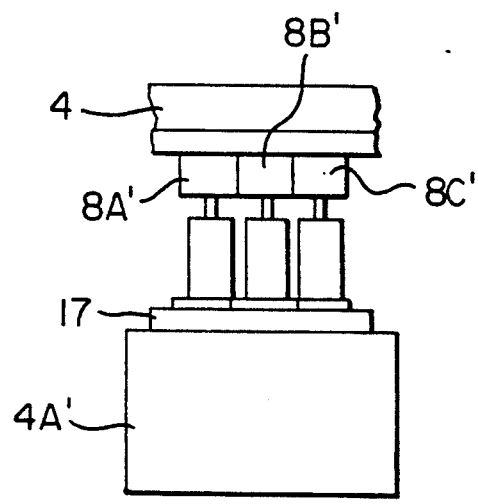
FIG. 5 is a schematic drawing of the pressure receiving plate supported by three load cells.

FIG. 5 schematically shows a pressure receiving plate 4A' supported by three load cells 8A', 8B', and 8C', similar to the arrangement shown in FIG. 1 wherein the three load cells 8A', 8B', and 8C' support the pressure exerting plate 7A.

What is claimed is:

1. A press apparatus for use in manufacturing a liquid crystal panel, including a pressure-exerting plate and a pressure-receiving plate, and exerting pressure to upper and lower glass substrates for the liquid crystal panel which are set between said pressure-exerting plate and said pressure-receiving plate, comprising:
    means for exerting pressure to drive said pressure-exerting plate against said pressure receiving plate;
    three load cells for supporting one of said pressure-exerting plate and said pressure-receiving plate, said three load cells each producing load detection signals, said load cells being disposed at positions corresponding to vertexes of a triangle as viewed in a direction which is substantially normal to the respective one of said pressure-exerting plate and said pressure-receiving plate supported by said three load cells, to detect a degree of parallelization between said pressure-exerting plate and said pressure-receiving plate while said pressure-exerting plate is driven against said pressure-receiving plate by said means for exerting pressure to exert pressure on said upper and lower glass substrates.

2. A press apparatus for use in manufacturing a liquid crystal panel, including a pressure-exerting plate and a pressure-receiving plate, and exerting pressure to upper and lower glass substrates for the liquid crystal panel which are set between said pressure-exerting plate and said pressure-receiving plate, comprising:
    means for exerting pressure to drive said pressure-exerting plate against said pressure receiving plate;
    three load cells for supporting one of said pressure-exerting plate and said pressure-receiving plate, said three load cells each producing load detection signals, said load cells being disposed at positions corresponding to vertexes of a triangle as viewed in a direction which is substantially normal to the respective one of said pressure-exerting plate and said pressure-receiving plate supported by said three load cells, to detect a degree of parallelization between said pressure-exerting plate and said pressure-receiving plate while said pressure-exerting plate is driven against said pressure-receiving plate by said means for exerting pressure to exert pressure on said upper and lower glass substrates;
    said means for exerting pressure including a pressing shaft which is movable up and down, and a movable pressure-transmitting plate fixed to an upper end portion of said pressing shaft, wherein said pressure-exerting plate is mounted on said pressure-transmitting plate through said three load cells.

3. A press apparatus according to claim 2, further comprising a computing means for calculating differences between said load detection signals from said three load cells, and a detection means receiving said differences calculated by said computing means and comparing said differences with at least one predetermined value, for determining that at least one of the differences exceeds said at least one predetermined value.

4. A press apparatus according to claim 2, further comprising a movable plate disposed between said pressure-exerting plate and said three load cells, and a fixed plate through which said pressure-receiving plate is fixed to said press apparatus, said pressure-exerting plate being in contact with said movable plate, said pressure-receiving plate being in contact with said fixed plate.

5. A press apparatus according to claim 2, further comprising supporting plates for respectively supporting said pressure-exerting plate and said pressure-receiving plate, wherein each of said pressure-exerting plate and said pressure-receiving plate includes a ceramic plate insulating said pressure-exerting plate and said pressure-receiving plate from said supporting plates, and further comprising metallic heating plates, each including a heating device therein, respectively disposed in each of said pressure-exerting plate and said pressure-receiving plate for heating said pressure-exerting plate and said pressure-receiving plate, respectively, to selected temperatures.

6. A press apparatus according to claim 5, wherein a first thermocouple for producing a first temperature detection signal is embedded in each said ceramic plate and a second thermocouple for producing a second temperature detection signal is embedded in each said metallic heating plate, a first and second control means receiving said first and second temperature detection signals, respectively, and producing a output control signal for controlling energization of said heating device, respectively, in accordance with said first and second temperature detection signals from said first and second thermocouples, respectively.

7. A press apparatus according to claim 6, wherein each said first thermocouple is disposed such that it can detect a temperature of a surface portion of said ceramic plate for producing said first temperature detection signal and each said second thermocouple is disposed such that it can detect a temperature of a portion of said metallic heating plate which is located near said heating device for producing said second temperature detection signal, a first and second thyristor and wherein said first control means includes a first thyristor control means and said second control means includes a second thyristor control means, each said heating device being connected to a power source through said first and second thyristor, respectively, each said first and second thyristor control means includes a first difference means for producing a first difference signal between two input signals, each said first thermocouple being connected to supply said first temperature detection signal as one of said two input signals to said first difference means respectively, first and second means each for supplying a first predetermined value as a first output signal being connected to supply said first output signal as one of said two input signals to said first difference means, respectively, each said first and second thyristor control means further includes a second difference means for producing a second difference signal between two input signals, each said second thermocouple being connected to supply said second temperature detection signal as one of said two input signals to said second difference means, respectively, a third and fourth means each for supplying a second predetermined value as a second output signal being connected to supply said second output signal as one of said two input signals to said second difference means, respectively, each on the basis of a value obtained by performing a first predetermined operation on the first difference signal produced by said first difference means, respectively, and said first and second thyristors each being controlled by said first and second thyristor control means, respectively, on the basis of a value obtained by performing a second predetermined operation on said second difference signal produced by said second difference means, respectively.

8. A press apparatus according to claim 7, wherein aid first and second predetermined operations each includes a PID operation.

9. A press apparatus according to claim 8, wherein each said heating device includes a plurality of heaters disposed in said respective metallic heating plate, each of said plurality of heaters being connected to said respective thyristor through a power adjuster.

10. A press apparatus according to claim 2, further comprising an A/D converter for A/D converting the load detection signals from said three load cells, and a microcomputer for receiving signals from said A/D converter, wherein said microcomputer calculates the differences in signals from said A/D converter to determine differences between the load detection signals from said three load cells, the determines whether at least one of the differences exceeds a predetermined value.

11. A press apparatus according to claim 10, further comprising a CRT display in communication with said microcomputer, for monitoring the load applied to each of said three load cells.

12. A press apparatus according to claim 2, wherein said pressing shaft is driven by an electric servo motor, wherein said press apparatus further includes poles, said movable pressure-transmitting plate being mounted on said poles through sleeve means for slidable movement along the poles in such a manner as to be slidable, and said pressure-receiving plate being connected to an upper end portion of said poles.

* * * * *